(12) United States Patent
Olsson et al.

(10) Patent No.: US 10,855,063 B2
(45) Date of Patent: Dec. 1, 2020

(54) METHOD IN THE MANUFACTURING OF AN INSULATED ELECTRIC HIGH VOLTAGE DC TERMINATION OR JOINT

(71) Applicant: NKT HV CABLES AB, Lyckeby (SE)

(72) Inventors: Carl-Olof Olsson, Västerås (SE); Markus Saltzer, Fislisbach (CH); Anders Lindgren, Karlskrona (SE)

(73) Assignee: NKT HV CABLES AB, Lyckeby (SE)

( * ) Notice: Subject to any disclaimer, the term of this patent is extended or adjusted under 35 U.S.C. 154(b) by 134 days.

(21) Appl. No.: 15/870,249

(22) Filed: Jan. 12, 2018

(65) Prior Publication Data

US 2018/0138674 A1    May 17, 2018

Related U.S. Application Data

(62) Division of application No. 14/649,131, filed as application No. PCT/EP2013/051890 on Jan. 31, 2013, now Pat. No. 9,991,687.

(51) Int. Cl.
*H02G 1/14* (2006.01)
*H01B 13/016* (2006.01)
(Continued)

(52) U.S. Cl.
CPC .......... *H02G 1/14* (2013.01); *H01B 13/0016* (2013.01); *H01B 13/0026* (2013.01);
(Continued)

(58) Field of Classification Search
CPC .. H02G 1/12; H02G 1/14; H02G 1/16; H02G 15/003; H02G 15/068; H02G 15/18;
(Continued)

(56) References Cited

U.S. PATENT DOCUMENTS 3,433,687 A   3/1969  Price
4,032,214 A   6/1977  McNerney
(Continued)

FOREIGN PATENT DOCUMENTS

AU   2012201176 A1   9/2012
CN     101817949 A   9/2010
(Continued)

OTHER PUBLICATIONS

Hansen et al., "Effect of Atomic Oxygen on Polymers," Journal of Polymer Science: Part A, vol. 3, No. 6, Jun. 1, 1965, pp. 2205-2214, XP055184481.
(Continued)

*Primary Examiner* — A. Dexter Tugbang
(74) *Attorney, Agent, or Firm* — Birch, Stewart, Kolasch & Birch, LLP

(57) ABSTRACT

A method in the manufacturing of an insulated electric high voltage DC termination or joint includes providing an insulated electric high voltage DC cable including a high voltage DC conductor, a polymer based insulation system surrounding the high voltage DC conductor, the polymer based insulation system including an insulation layer and a semiconducting layer surrounding the insulation layer, and a grounding layer surrounding the semiconducting layer; removing the grounding layer and the semiconducting layer in at least one end portion of the high voltage DC cable, mounting a field grading adapter or joint body in the at least one end portion of the high voltage DC cable; and subjecting the insulation layer of the polymer based insulation system in the at least one end portion of the high voltage DC cable for a heat treatment procedure, while being covered by the mounted field grading adapter or joint body.

5 Claims, 4 Drawing Sheets

(51) Int. Cl.
*H02G 1/16* (2006.01)
*H02G 1/12* (2006.01)
*H02G 15/18* (2006.01)
*H02G 15/00* (2006.01)
*H01B 13/00* (2006.01)
*H02G 15/068* (2006.01)
*H02G 15/188* (2006.01)

(52) U.S. Cl.
CPC ..... *H01B 13/0162* (2013.01); *H01B 13/0165* (2013.01); *H02G 1/12* (2013.01); *H02G 1/16* (2013.01); *H02G 15/003* (2013.01); *H02G 15/18* (2013.01); *H02G 15/068* (2013.01); *H02G 15/188* (2013.01); *Y10T 29/49119* (2015.01); *Y10T 29/49123* (2015.01)

(58) Field of Classification Search
CPC .............. H02G 15/188; H01B 13/0016; H01B 13/0026; H01B 13/0162; H01B 13/0165; Y10T 29/49119; Y10T 29/49123
See application file for complete search history.

(56) References Cited

U.S. PATENT DOCUMENTS

| | | | |
|---|---|---|---|
| 4,061,703 A | 12/1977 | Rothenberg et al. | |
| 4,204,896 A | 5/1980 | Richardson | |
| 4,360,706 A | 11/1982 | Lanfranconi et al. | |
| 7,251,881 B2 | 8/2007 | Nguyen et al. | |
| 7,371,112 B2 * | 5/2008 | Burris | Y10T 29/49123 29/828 |
| 2009/0260736 A1 | 10/2009 | Charette | |
| 2010/0314022 A1 | 12/2010 | Olsson | |

FOREIGN PATENT DOCUMENTS

| | | | | |
|---|---|---|---|---|
| CN | 101911213 A | | 12/2010 | |
| CN | 102231497 A | | 11/2011 | |
| EP | 0 170 440 A1 | | 2/1986 | |
| EP | 0 212 851 A2 | | 3/1987 | |
| EP | 0 571 386 A1 | | 12/1993 | |
| EP | 2 093 774 A1 | | 8/2009 | |
| EP | 2197080 A1 | | 6/2010 | |
| EP | 2 498 262 A1 | | 9/2012 | |
| JP | 2001-69630 A | | 3/2001 | |
| JP | 2001169428 A | * | 6/2001 | .......... H02G 1/1297 |
| JP | 2011-515791 A | | 5/2011 | |
| WO | WO 92/03865 A1 | | 3/1992 | |
| WO | WO 2004/038735 A1 | | 5/2004 | |
| WO | WO 2009/103630 A1 | | 8/2009 | |

OTHER PUBLICATIONS

Canadian Office Action and Search Report, dated Jun. 20, 2017, for Canadian 2,898,837.
Chinese Office Action and Search Report, dated Jun. 14, 2017, for Chinese 201380072055.7, with an English translation.
Korean Office Action and English translation, dated May 1, 2017 for Korean Application No. 10-2015-7022615.
European Office Action, dated Feb. 7, 2018, for European Application No. 13704032.5.

* cited by examiner

METHOD IN THE MANUFACTURING OF AN INSULATED ELECTRIC HIGH VOLTAGE DC TERMINATION OR JOINT

CROSS-REFERENCE TO RELATED APPLICATIONS

This application is a Divisional of U.S. patent application Ser. No. 14/649,131 filed on Jun. 2, 2015, which was filed as the National Phase of PCT International Application No. PCT/EP2013/051890 filed on Jan. 31, 2013, all of which are hereby expressly incorporated by reference into the present application.

TECHNICAL FIELD OF THE INVENTION

The present invention relates generally to high voltage electrical power equipment. More particularly, the invention relates to a method in the manufacturing of an insulated electric high voltage DC termination or joint.

DESCRIPTION OF RELATED ART AND BACKGROUND OF THE INVENTION

Extruded solid insulation based on a polyethylene, or a crosslinked polyethylene (XLPE), has for almost 40 years been used for AC transmission and distribution cable insulation. Therefore the possibility of the use of XLPE for DC cable insulation has been under investigation for many years. Cables with such insulations for DC transmission have no restrictions on circuit length and they also have a potential for being operated at higher temperatures, thus offering a possibility to increase the transmission load.

It is, however, well known that this type of XLPE composition exhibits a strong tendency to form space charges under DC electric fields, thus making it unsuitable in insulation systems for DC cables. However, it is also known that extended degassing, i.e., subjecting the crosslinked cable insulation to high temperatures for long periods of time, will result in a decreased tendency to space charge accumulation under DC voltage stress. It is generally believed that the heat treatment removes the peroxide decomposition products, such as acetophenone and cumyl alcohol, from the insulation whereby the space charge accumulation is reduced. Degassing is, however, a time-consuming batch-process comparable with impregnation of paper insulations and thus as costly. Therefore it is advantageous if the need for degassing is removed.

EP 2093774 A1 provides a method for producing an insulated electric high voltage DC cable or a high voltage DC termination or joint with a polymer based, preferably polyethylene, electrical insulation system suitable for use in DC transmission and distribution networks carried out in a manner such that there is no need for any lengthy time consuming batch-treatment (e.g. heat treatment) of the cable to ensure stable and consistent dielectric properties and a high and consistent electric strength of the cable insulation. The resulting cable insulation further exhibits a low tendency to space charge accumulation, a high DC breakdown strength, and a high impulse strength and high insulation resistance.

The method comprises subjecting the polymer based insulation system for a heat treatment procedure while the outer surface of the polymer based insulation system is covered by a cover impermeable to at least one substance present in the polymer based insulation system in a non-homogenous distribution, thereby equalizing the concentration of the at least one substance in the polymer based insulation system. The method may be performed for a DC cable subsequent to subjecting the DC cable for a heat treatment while the outer surface of the extruded polymer based insulation system is not covered by any impermeable cover to thereby remove another substance, e.g. methane, present in the polymer based insulation system after crosslinking. The at least one substance may include a rest or byproduct from crosslinking, preferably a peroxide decomposition product, and/or an additive, e.g. an antioxidant.

The heat treatment procedure is performed at a temperature of between 50 and 120° C., and most preferably between 70 and 90° C., and is relatively fast.

SUMMARY

While the above approach provides high quality high voltage DC cable, the present inventor has noted that it is in many situations insufficient for high voltage DC terminations and joints. During the manufacturing thereof, the outer layers of a high voltage DC cable end portion are stripped, i.e., removed, uncovering the polymer based insulation system before a rubber based field grading device is mounted. The stripping of the outer layers including a grounding layer is performed in air and may take several hours for a thick cable. During this operation, the distribution of one or more substances in the exposed portion of the polymer based insulation system, especially close to an outer surface thereof, is altered due to diffusion of the one or more substances to the exposed surface of the polymer based insulation system, followed by evaporation from the surface to the surrounding air. This problem has been shown to occur even if the concentrations of the one or more substances in the polymer based insulation system in the high voltage DC cable were perfectly equalized prior to stripping.

An object is therefore to remedy this problem and to offer a method in the manufacturing of an insulated electric high voltage DC termination or joint that provides for a high voltage DC termination or joint, wherein the distribution of at least one substance in the polymer based insulation system in a cable end is improved, thereby achieving a reasonably good radial distribution of the conductivity within the polymer based insulation system.

In one aspect a method in the manufacturing of an insulated electric high voltage DC termination or joint comprises (i) providing an insulated electric high voltage DC cable comprising a high voltage DC conductor; a polymer based insulation system surrounding the high voltage DC conductor and comprising an insulation layer and a semiconducting layer surrounding the insulation layer; and a grounding layer surrounding the semiconducting layer; (ii) removing the grounding layer and the semiconducting layer in at least one end portion of the high voltage DC cable, thereby exposing the insulation layer of the polymer based insulation system in the at least one end portion of the high voltage DC cable; (iii) temporarily covering the insulation layer of the polymer based insulation system in the at least one end portion of the high voltage DC cable by a cover impermeable to at least one substance present in the insulation layer of the polymer based insulation system in the at least one end portion of the high voltage DC cable in a non-homogenous distribution; (iv) subjecting the insulation layer of the polymer based insulation system in the at least one end portion of the high voltage DC cable for a heat treatment procedure, while being covered by the cover, thereby equalizing the concentration of the at least one substance in the insulation layer of the polymer based insulation system in the at least one end portion of the high voltage DC cable; and (v) removing the cover.

The method is preferably performed in an initial phase of the manufacturing of the insulated electric high voltage DC termination or joint, before any termination or joint adapters or bodies are mounted.

Preferably, the cover is also covering any exposed portions of the semiconducting layer of the polymer based insulation system in the at least one end portion of the high voltage DC cable to prevent diffusion from those portions during the heat treatment.

In one embodiment, a field grading adapter or joint body is pre-equalized. The field grading adapter or joint body is mounted in an end portion of a piece of cable having an exposed insulation layer with a similar composition as the insulation layer of the polymer based insulation system of the high voltage DC cable (to which the field grading adapter or joint body later is to be mounted), thereby covering the exposed insulation layer of the piece of cable. The field grading adapter or joint body is subjected to a heat treatment procedure such that one or more substances from the insulation layer of the piece of cable diffuse into the field grading layer. The field grading adapter or joint body is removed from the piece of cable and the inner surface of the field grading adapter or joint body is temporarily covered with a cover, which is impermeable to the one or more substances diffused into the field grading layer, until the field grading adapter or joint body is mounted in the at least one end portion of the high voltage DC cable. In the above process, the field grading adapter or joint body is prepared to obtain approximately the same distribution of substances as would be obtained after equalization with the field grading adapter or joint body mounted to the high voltage DC cable, but can be made in advance and at a more convenient location.

In a second aspect a method in the manufacturing of an insulated electric high voltage DC termination or joint comprises the step of (i) providing an insulated electric high voltage DC cable comprising a high voltage DC conductor, a polymer based insulation system surrounding the high voltage DC conductor and comprising an insulation layer and a semiconducting layer surrounding the insulation layer and a grounding layer surrounding the semiconducting layer; (ii) removing the grounding layer and the semiconducting layer in at least one end portion of the high voltage DC cable, thereby exposing the insulation layer of the polymer based insulation system in the at least one end portion of the high voltage DC cable; (iii) mounting a field grading adapter or joint body, preferably comprising rubber as a field grading material, in the at least one end portion of the high voltage DC cable, thereby covering the insulation layer of the polymer based insulation system in the at least one end portion of the high voltage DC cable, the field grading adapter or joint body being part of the high voltage DC termination or joint and at least one substance being present in the insulation layer of the polymer based insulation system in the at least one end portion of the high voltage DC cable in a non-homogenous distribution; and (iv) subjecting the insulation layer of the polymer based insulation system in the at least one end portion of the high voltage DC cable for a heat treatment procedure, while being covered by the mounted field grading adapter or joint body, thereby equalizing the concentration of the at least one substance in the insulation layer of the polymer based insulation system in the at least one end portion of the high voltage DC cable.

When a high voltage DC cable end is mounted with a rubber based field grading adapter or joint body, there is probably not immediately an equilibrium distribution of chemicals between the cable insulation and the adapter or body. The substances present in the insulation layer may diffuse into the adapter or body and substances present in the adapter or body may diffuse into the insulation layer. In order to obtain a robust insulation system, the distribution of substances needs to be sufficiently uniform, and this is obtained by the above heat treatment procedure.

In one embodiment, the field grading adapter or joint body is temporarily covered by a cover impermeable to the at least one substance present in the insulation layer of the polymer based insulation system in the at least one end portion of the high voltage DC cable in a non-homogenous distribution before performing the heat treatment and the cover is removed after the heat treatment. This is generally not required since the layer, e.g. rubber layer, of the field grading adapter or joint body is typically so thick that even if diffusion to the surrounding takes place at the outer surface of the field grading adapter or joint body, this will not affect the concentration distribution in the polymer based insulation system.

During the heat treatment any exposed portions of the semiconducting layer of the polymer based insulation system in the at least one end portion of the high voltage DC cable may be covered by insulating or semiconducting material to prevent or reduce diffusion from those portions during the heat treatment.

In a further embodiment, a second insulated electric high voltage DC cable is provided, the second high voltage DC cable comprising a high voltage DC conductor, a polymer based insulation system surrounding the high voltage DC conductor and comprising an insulation layer and a semiconducting layer surrounding the insulation layer, and a grounding layer surrounding the semiconducting layer; the grounding layer and the semiconducting layer of the second high voltage DC cable are removed in at least one end portion of the second high voltage DC cable, thereby exposing the insulation layer of the polymer based insulation system of the second high voltage DC cable in the at least one end portion of the second high voltage DC cable; and the field grading adapter or joint body, which here is a joint body, is mounted in the at least one end portion of the second high voltage DC cable, thereby covering the insulation layer of the polymer based insulation system of the second high voltage DC cable in the at least one end portion of the second high voltage DC cable, wherein the at least one substance is present in the insulation layer of the polymer based insulation system in the at least one end portion of the second high voltage DC cable in a non-homogenous distribution, and wherein the step of subjecting comprises subjecting the insulation layer of the polymer based insulation system of the second high voltage DC cable in the at least one end portion of the second high voltage DC cable for the heat treatment procedure, while being covered by the mounted field grading adapter or joint body, thereby equalizing the concentration of the at least one substance in the insulation layer of the polymer based insulation system of the second high voltage DC cable in the at least one end portion of the second high voltage DC cable. Also in this embodiment, while the entire joint could be temporarily or permanently covered as above during the heat treatment procedure, this is not generally required.

During the heat treatment any exposed portions of the semiconducting layer of the polymer based insulation system in the at least one end portion of the second high voltage DC cable may also be covered by insulating or semiconducting material to prevent or reduce diffusion from those portions during the heat treatment.

In particular, the concentration of the at least one substance may be equalized adjacent to the outer surface of the insulation layer of the polymer based insulation.

The polymer based insulation system may comprise a compounded or crosslinked polyethylene (XLPE) composition. The at least one substance may in such case include rest or byproducts from crosslinking reactions, preferably a peroxide decomposition product.

Alternatively, or additionally, the polymer based insulation system may comprise a thermoplastics and the at least one substance may include one or more additive, such as an antioxidant, low molecule weight fractions of the polymer used in the polymer based insulation system, moisture, and/or process chemicals.

The rubber of the field grading adapter or joint body may comprise rest or byproducts from the crosslinking reaction, one or more antioxidant, one or more plasticizers, process chemicals, and/or moisture.

The heat treatment procedure may be performed for example by applying thermal bands or heating bands on the parts to be heated, by generating heat in the conductor which will increase the heat of the insulation layer, in a heating chamber, such as an oven, in or by any other suitable heating device known in the art.

The heat treatment procedure may be performed at a temperature of between 50 and 120° C., and most preferably between 70 and 90° C. and for a time that is dependent on the temperature at which the heat treatment procedure is performed. Generally, the temperature and time are selected to provide a sufficiently uniform distribution of substances and conductivity. This will depend on the substances, and especially the substances dominating the conductivity characteristics. In a system with generally very low concentrations of substances, e.g. antioxidants and moisture, there may still be large influences on the conductivity due to the presence of them. Nevertheless, the heat treatment times are less or much less than the times required for degassing of the substances as disclosed in the prior art section.

The step of providing an insulated electric high voltage DC cable comprising a high voltage DC conductor, a polymer based insulation system surrounding the high voltage DC conductor, and a grounding layer surrounding the polymer based insulation system may include the following steps. The polymer based insulation system is covered by a cover impermeable to the at least one substance present in the polymer based insulation system in a non-homogenous distribution, and the polymer based insulation system is subjected for a heat treatment procedure while the outer surface of the polymer based insulation system is kept covered by the cover, thereby equalizing the concentration of the at least one substance in the polymer based insulation system. The cover may be part of the high voltage DC cable and comprises the grounding layer or may be a temporary cover, which is removed after the heat treatment procedure of the polymer based insulation system of the high voltage DC cable. Shortly speaking, the high voltage DC cable used in the present invention has been treated in accordance with the principles disclosed in EP 2093774 A1, the contents of which being hereby incorporated by reference.

The invention can be applied in the manufacturing and/or installation of high voltage DC cable systems for HVDC systems. Hereby, cable systems for higher voltage levels can be achieved at lower total cost.

For cable systems that are on the edge of meeting the electrical requirements, the use of the invention will reduce the risks of breakdowns during testing and operation.

Applying the invention, the conductivity characteristics of the insulation system will already at installation be close to the conductivity characteristics that are obtained for a system that has been used during long time. Hereby, the risks associated with a new installation will be reduced and the user could expect a more reliable operation.

Further characteristics of the invention and advantages thereof will be evident from the following detailed description of embodiments of the invention.

DETAILED DESCRIPTION OF EMBODIMENTS

Figure 1:
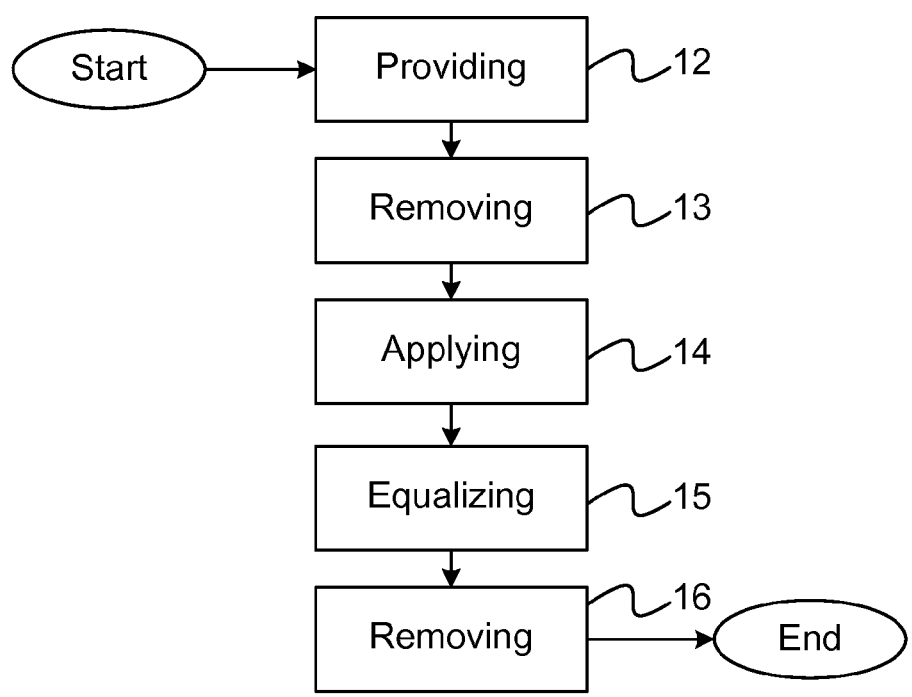
FIG. 1 is a schematic flow scheme of a method for providing an insulated electric high voltage DC termination or joint according to an embodiment.
Figure 2:
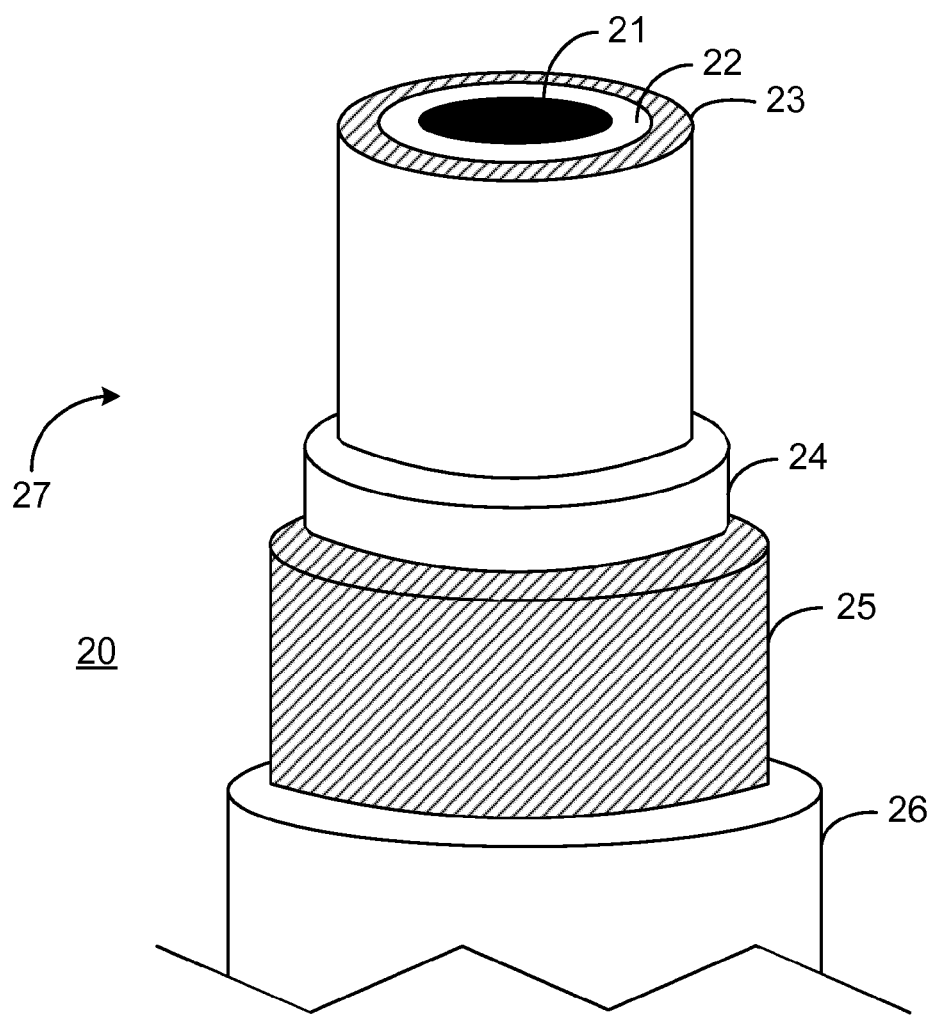
FIG. 2 illustrates schematically in a perspective view an end of a high voltage DC cable during the method illustrated in FIG. 1.

A method in the manufacturing of an insulated electric high voltage DC termination or joint according to one embodiment will now be described with reference to FIGS. 1 and 2. The latter Figure shows an end portion of an insulated electric high voltage DC cable 20 during the method, the high voltage DC cable 20 comprising from inside and out a high voltage DC conductor 21; a polymer based insulation system 22-24 comprising a semiconducting layer 22, and an insulation layer 23, and a further semiconducting layer 24; a grounding layer 25; and an outer covering or sheath 26. The grounding layer 25 may comprise an extruded layer of lead or a combination of copper wires and a thin diffusion tight layer.

The polymer based insulation system 22-24 may be extruded, molded, or manufactured in any convenient manner. The insulation layer 23 may be a crosslinked polyethylene layer, a thermoplastic layer, or a layer of other suitable material. The high voltage DC cable 20 may be manufactured as disclosed in EP 2 093774 A1 to obtain an equalized high voltage DC cable 20.

The method in the manufacturing of an insulated electric high voltage DC termination or joint, which is performed in an initial phase of the manufacturing of the insulated electric high voltage DC termination or joint, begins, in a step 12, by providing the high voltage DC cable. Next, the outer covering or sheath 26, the grounding layer 25 and the semiconducting layer 24 are, in a step 13, removed in one end portion 27 of the high voltage DC cable 20, thereby exposing the insulation layer 23 in the at least one end portion 27 of the high voltage DC cable 20. Thereafter, the insulation layer 23 is, in a step 14, temporarily covered in the end portion 27 of the high voltage DC cable 20 by a cover impermeable to at least one substance present in the insulation layer 23 in the end portion 27 of the high voltage DC cable 20 in a non-homogenous distribution. The insulation layer 23 is, in a step 15, in the end portion 27 of the high voltage DC cable 20, subjected for a heat treatment procedure, while being covered by the cover, thereby equalizing the concentration of the substance in the insulation layer 23 of the polymer based insulation system 22-24 in the end portion 27 of the high voltage DC cable 20. Finally, the cover is, in a step 16, removed, and the method is ended. FIG. 2 shows the resulting end portion 27 of the high voltage DC cable 20.

Preferably, the cover is also covering any exposed portions of the semiconducting layer 24 of the polymer based insulation system 22-24 in the at least one end portion 27 of the high voltage DC cable 20 to prevent diffusion from those portions during the heat treatment.

A high voltage DC cable joint is manufactured by repeating the above method for a second high voltage DC cable, and by mounting a joint body to the high voltage DC cable ends.

A high voltage DC cable termination is manufactured by mounting a field grading adapter to the end portion 27 of the high voltage DC cable 20.

It shall be appreciated that when the cover has been removed in step 16, the polymer based insulation system 22-24 has to be covered as soon as possible, e.g. by mounting the field grading adapter or joint body or by assembling a final diffusion barrier.

The field grading adapter or joint body may be pre-equalized by means of mounting the field grading adapter or joint body in an end portion of a piece of cable having an exposed insulation layer with a similar composition as the insulation layer 23 of the polymer based insulation system 22-24 of the high voltage DC cable 20, thereby covering the exposed insulation layer of the piece of cable, subjecting the field grading adapter or joint body to a heat treatment procedure such that one or more substances from the insulation layer of the piece of cable diffuse into the field grading layer, and removing the field grading adapter or joint body from the piece of cable and covering the inner surface of the field grading adapter or joint body with a cover, which is impermeable to the one or more substances diffused into the field grading layer, until the field grading adapter or joint body is mounted in the end portion 27 of the high voltage DC cable 20.

Figure 3:
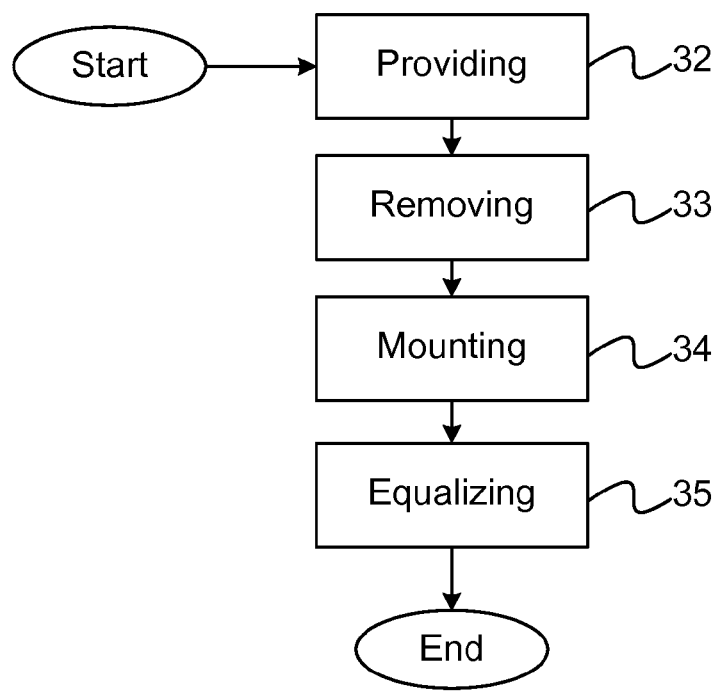
FIG. 3 is a schematic flow scheme of a method for providing an insulated electric high voltage DC termination or joint according to a further embodiment embodiment.
Figure 4:
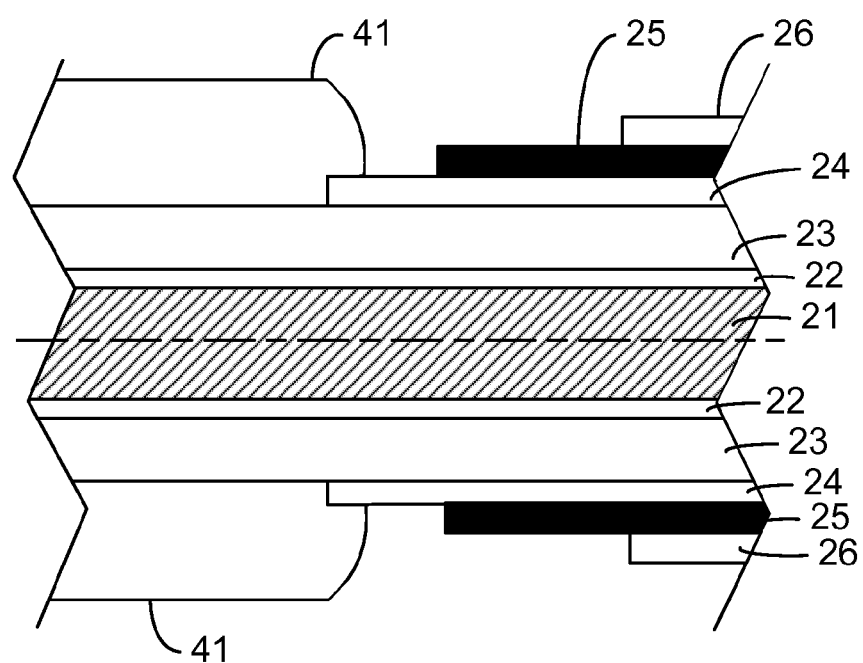
FIG. 4 illustrates schematically in a perspective view an end of a high voltage DC cable during the method illustrated in FIG. 3.

With reference next to FIGS. 3 and 4, a method in the manufacturing of an insulated electric high voltage DC termination or joint according to another embodiment will be described. The method begins with providing, in a step 32, an insulated electric high voltage DC cable 20, e.g. the high voltage DC cable 20 as disclosed with reference to FIGS. 1 and 2.

The outer covering or sheath 26 and the grounding layer 25 and the semiconducting layer 24 are, in a step 33, removed in at least one end portion 27 of the high voltage DC cable 20, thereby exposing the insulation layer 23 of the polymer based insulation system 22-24 in the end portion 27 of the high voltage DC cable 20. A field grading adapter or joint body 41 (FIG. 4) is, in a step 34, mounted in the end portion 27 of the high voltage DC cable 20, thereby covering the insulation layer 23 of the polymer based insulation system 22-24 in the end portion 27 of the high voltage DC cable 20, the field grading adapter or joint body 41 being part of the high voltage DC termination or joint and comprising a rubber based material. Finally, the insulation layer 23 of the polymer based insulation system 22-24 is, in a step 35, in the end portion of the high voltage DC cable, subjected for a heat treatment procedure, while being covered by the mounted field grading adapter or joint body 41, thereby equalizing the concentration of the substance in the insulation layer 23 of the polymer based insulation system 22-24 in the end portion 27 of the high voltage DC cable 20. FIG. 4 shows the resulting end portion 27 of the high voltage DC cable 20 after equalization with the field grading adapter or joint body 41 mounted.

Alternatively, the field grading adapter or joint body 41 is temporarily covered by a cover impermeable to the substance present in the insulation layer 23 of the polymer based insulation system 22-24 in the end portion 27 of the high voltage DC cable 20 in a non-homogenous distribution before performing the heat treatment procedure, wherein the cover is removed after the heat treatment procedure.

During the heat treatment any exposed portions of the semiconducting layer 24 of the polymer based insulation system 22-24 in the at least one end portion 27 of the high voltage DC cable 20 may be covered by insulating or semiconducting material to prevent or reduce diffusion from those portions during the heat treatment.

In one embodiment, a second insulated electric high voltage DC cable is provided, wherein the second high voltage DC cable may be identical to the first high voltage DC cable 20. The outer covering or sheath, the grounding layer, and the semiconducting layer of the second high voltage DC cable is removed in at least one end portion of the second high voltage DC cable, thereby exposing the insulation layer of the second high voltage DC cable in the end portion of the second high voltage DC cable. The joint body 41 is mounted also to the end portion of the second high voltage DC cable, thereby covering the insulation layer of the second high voltage DC cable in the end portion of the second high voltage DC cable. The above disclosed heat treatment procedure comprises subjecting also the insulation layer of the second high voltage DC cable in the end portion of the second high voltage DC cable for the heat treatment, while being covered by the mounted joint body 41, thereby also equalizing the concentration of the substance in the insulation layer of the second high voltage DC cable in the end portion of the second high voltage DC cable.

If the polymer based insulation system 22-24 comprises a compounded or crosslinked polyethylene (XLPE) composition, the substance may be a rest or byproduct from crosslinking reactions, preferably a peroxide decomposition product.

If the polymer based insulation system 22-24 comprises a thermoplastics, the substance may be an additive, such as an antioxidant, low molecule weight fractions of the polymer used in the polymer based insulation system, moisture, or a process chemical.

If the field grading adapter or joint body 41 comprises a rubber materiel, it may contain rest or byproducts from the crosslinking reaction, one or more antioxidant, one or more plasticizers, process chemicals, and/or moisture, which may diffuse into the polymer based insulation system 22-24 after the mounting of the field grading adapter or joint body 41.

The heat treatment procedure may be performed at a temperature of between 50 and 120° C., and most preferably between 70 and 90° C. and for a time that is dependent on the temperature at which the heat treatment procedure is performed and on the substance concentrations, materials, and geometry of the end portion 27 of the high voltage DC cable 27. Generally, the temperature and time are selected to provide a sufficiently uniform distribution of substances and conductivity for each cable and application.

The invention claimed is:

1. A method in the manufacturing of an insulated electric high voltage DC termination or joint comprising the steps of:
   providing an insulated electric high voltage DC cable comprising a high voltage DC conductor, a polymer based insulation system surrounding the high voltage DC conductor, the polymer based insulation system comprising an insulation layer and a semiconducting layer surrounding the insulation layer, and a grounding layer surrounding the semiconducting layer;

removing the grounding layer and the semiconducting layer in at least one end portion of the high voltage DC cable, thereby exposing the insulation layer of the polymer based insulation system in the at least one end portion of the high voltage DC cable;

mounting a field grading adapter or joint body in the at least one end portion of the high voltage DC cable, thereby covering the insulation layer of the polymer based insulation system in the at least one end portion of the high voltage DC cable, the field grading adapter or joint body being part of the high voltage DC termination or joint, wherein at least one substance is present in the insulation layer of the polymer based insulation system in the at least one end portion of the high voltage DC cable in a non-homogenous distribution; and subjecting the insulation layer of the polymer based insulation system in the at least one end portion of the high voltage DC cable for a heat treatment procedure, while being covered by the mounted field grading adapter or joint body, thereby equalizing a concentration of the at least one substance in the insulation layer of the polymer based insulation system in the at least one end portion of the high voltage DC cable.

2. The method of claim 1, further comprising the steps of:

temporarily covering the field grading adapter or joint body by a cover impermeable to the at least one substance present in the insulation layer of the polymer based insulation system in the at least one end portion of the high voltage DC cable in a non-homogenous distribution before performing the step of subjecting; and removing the cover after the step of subjecting.

3. The method of claim 2, wherein a second insulated electric high voltage DC cable is provided, the second insulated electric high voltage DC cable comprising a second high voltage DC conductor; a polymer based insulation system surrounding the second high voltage DC conductor, the polymer based insulation system comprising an insulation layer and a semiconducting layer surrounding the insulation layer; and a grounding layer surrounding the semiconducting layer; the grounding layer and the semiconducting layer of the second insulated electric high voltage DC cable are removed in at least one end portion of the second insulated electric high voltage DC cable, thereby exposing the insulation layer of the polymer based insulation system of the second insulated electric high voltage DC cable in the at least one end portion of the second insulated electric high voltage DC cable; and a field grading adapter or joint body of the second insulated electric high voltage DC cable is mounted in the at least one end portion of the second insulated electric high voltage DC cable, thereby covering the insulation layer of the polymer based insulation system of the second insulated electric high voltage DC cable in the at least one end portion of the second insulated electric high voltage DC cable, wherein the at least one substance is present in the insulation layer of the polymer based insulation system in the at least one end portion of the second insulated electric high voltage DC cable in a non-homogenous distribution, and wherein the step of subjecting further comprises the step of:

subjecting the insulation layer of the polymer based insulation system of the second insulated electric high voltage DC cable in the at least one end portion of the second insulated electric high voltage DC cable for the heat treatment procedure, while being covered by the mounted joint body of the second insulated electric high voltage DC cable, thereby equalizing the concentration of the at least one substance in the insulation layer of the polymer based insulation system of the second insulated electric high voltage DC cable in the at least one end portion of the second insulated electric high voltage DC cable.

4. The method of claim 1, wherein a second insulated electric high voltage DC cable is provided, the second insulated electric high voltage DC cable comprising a second high voltage DC conductor; a polymer based insulation system surrounding the second high voltage DC conductor, the polymer based insulation system comprising an insulation layer and a semiconducting layer surrounding the insulation layer; and a grounding layer surrounding the semiconducting layer; the grounding layer and the semiconducting layer of the second insulated electric high voltage DC cable are removed in at least one end portion of the second insulated electric high voltage DC cable, thereby exposing the insulation layer of the polymer based insulation system of the second insulated electric high voltage DC cable in the at least one end portion of the second insulated electric high voltage DC cable; and a field grading adapter or joint body of the second insulated electric high voltage DC cable is mounted in the at least one end portion of the second insulated electric high voltage DC cable, thereby covering the insulation layer of the polymer based insulation system of the second insulated electric high voltage DC cable in the at least one end portion of the second insulated electric high voltage DC cable, wherein the at least one substance is present in the insulation layer of the polymer based insulation system in the at least one end portion of the second insulated electric high voltage DC cable in a non-homogenous distribution, and wherein the step of subjecting further comprises the step of:

subjecting the insulation layer of the polymer based insulation system of the second insulated electric high voltage DC cable in the at least one end portion of the second insulated electric high voltage DC cable for the heat treatment procedure, while being covered by the mounted joint body of the second insulated electric high voltage DC cable, thereby equalizing the concentration of the at least one substance in the insulation layer of the polymer based insulation system of the second insulated electric high voltage DC cable in the at least one end portion of the second insulated electric high voltage DC cable.

5. The method of claim 1, wherein the field grading adapter or joint body comprises rubber as a field grading material.

* * * * *